US007969232B2

(12) United States Patent
Chang et al.

(10) Patent No.: US 7,969,232 B2
(45) Date of Patent: Jun. 28, 2011

(54) BOOSTER AND VOLTAGE DETECTION METHOD THEREOF

(75) Inventors: Yaw-Guang Chang, Tainan County (TW); Chin-Feng Hsu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 0 days.

(21) Appl. No.: 12/550,633

(22) Filed: Aug. 31, 2009

(65) Prior Publication Data

US 2011/0050189 A1 Mar. 3, 2011

(51) Int. Cl.
*G05F 1/10* (2006.01)

(52) U.S. Cl. .......................................... 327/536; 363/60

(58) Field of Classification Search .................. 327/536; 363/59–60
See application file for complete search history.

(56) References Cited

U.S. PATENT DOCUMENTS

| | | | | |
|---|---|---|---|---|
| 5,909,141 A * | 6/1999 | Tomishima | ..................... | 327/536 |
| 6,055,168 A * | 4/2000 | Kotowski et al. | ................ | 363/60 |
| 6,518,830 B2 * | 2/2003 | Gariboldi et al. | .............. | 327/536 |
| 6,744,224 B2 * | 6/2004 | Ishii | ................................ | 315/291 |
| 6,927,441 B2 * | 8/2005 | Pappalardo et al. | ........... | 257/299 |
| 7,138,853 B2 * | 11/2006 | Kim et al. | ....................... | 327/536 |
| 7,710,194 B2 * | 5/2010 | Kang | .............................. | 327/536 |
| 7,808,220 B2 * | 10/2010 | Rader et al. | ..................... | 323/268 |
| 2005/0047181 A1 * | 3/2005 | Yamamoto et al. | .............. | 363/60 |
| 2007/0030712 A1 * | 2/2007 | Earl et al. | ......................... | 363/60 |
| 2007/0052471 A1 * | 3/2007 | Ng | ................................. | 327/536 |
| 2010/0033232 A1 * | 2/2010 | Pan | ................................ | 327/536 |
| 2010/0171372 A1 * | 7/2010 | Kim et al. | ...................... | 307/109 |

* cited by examiner

*Primary Examiner* — Lincoln Donovan
*Assistant Examiner* — Thomas J Hiltunen
(74) *Attorney, Agent, or Firm* — J.C. Patents

(57) ABSTRACT

A booster and a voltage detection method thereof are provided herein. The booster includes a charge pump circuit and a voltage detection circuit. The charge pump circuit is controlled by a switching signal to generate an actual voltage according to the basis voltage, wherein the actual voltage is a product of the basis voltage multiplied by a first preset multiplier. The voltage detection circuit is coupled to the charge pump circuit. The voltage detection circuit selects one of a plurality of first multipliers to serve as the first preset multiplier according to a comparison result between the basis voltage and a target voltage, and generates the switching signal corresponding to the first preset multiplier. Therefore, the booster can properly select the first preset multiplier to generate the actual voltage as the basis voltage changes.

13 Claims, 7 Drawing Sheets

| B1 | B2 | PM |
|---|---|---|
| 1.5xVCI>Vtar | 2xVCI>Vtar | |
| 1 | 1 | x1.5 |
| 0 | 1 | x2 |
| 0 | 0 | x3 |

FIG. 5

| B11 | B10 | B01 | B00 | PM |
|---|---|---|---|---|
| 1.5xVCI>Vtar +ΔBT1+ΔBT2 | 1.5xVCI>Vtar +ΔBT1 | 2xVCI>Vtar +ΔBT1+ΔBT2 | 2xVCI>Vtar +ΔBT1 | |
| 1 | 1 | 1 | 1 | x1.5 |
| 0 | 1 | 1 | 1 | x1.5 |
| 0 | 0 | 1 | 1 | x2 |
| 0 | 0 | 0 | 1 | x2 |
| 0 | 0 | 0 | 0 | x3 |

BOOSTER AND VOLTAGE DETECTION METHOD THEREOF

BACKGROUND OF THE INVENTION

1. Field of Invention

The present invention relates to a booster and a voltage detection method thereof, and more particular, to a booster that detects a power source thereof to efficiently generate a target voltage.

2. Description of Related Art

Figure 1A:
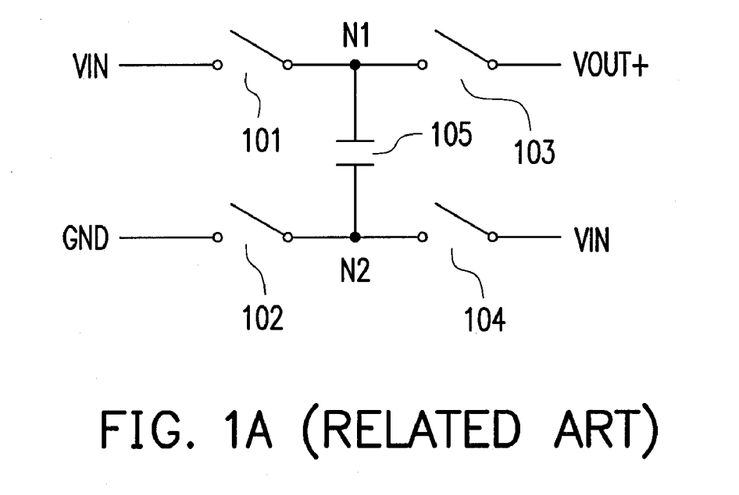
FIG. 1A is a diagram of a charge pump circuit providing a double positive voltage.

In an electronic device, a plurality of charge pump circuits are usually required for providing various power voltage levels. The charge pump circuit uses capacitors as energy storage elements and uses switching devices to control the connection of voltages to the capacitors. FIG. 1A is a diagram of a charge pump circuit providing a double positive voltage. Referring to FIG. 1A, during a charge period, switches 101 and 102 are turned on, and switches 103 and 104 are turned off. An input voltage VIN and a ground voltage GND are respectively coupled to two terminals of a capacitor 105, and charge the capacitor 105, so that a voltage difference between the terminals N1 and N2 of the capacitor 105 is the input voltage VIN. During a pump period, the switches 101 and 102 are turned off, and the switches 103 and 104 are turned on. At present, the voltage level of the terminal N2 of the capacitor 105 rises from the original ground voltage GND to the input voltage VIN, and the voltage level of the terminal N1 of the capacitor 105 rises from the original input voltage VIN to the double input voltage 2×VIN, i.e. an output voltage VOUT+=2×VIN, since the voltage difference between the terminals N1 and N2 of the capacitor 105 is the input voltage VIN.

Figure 1B:
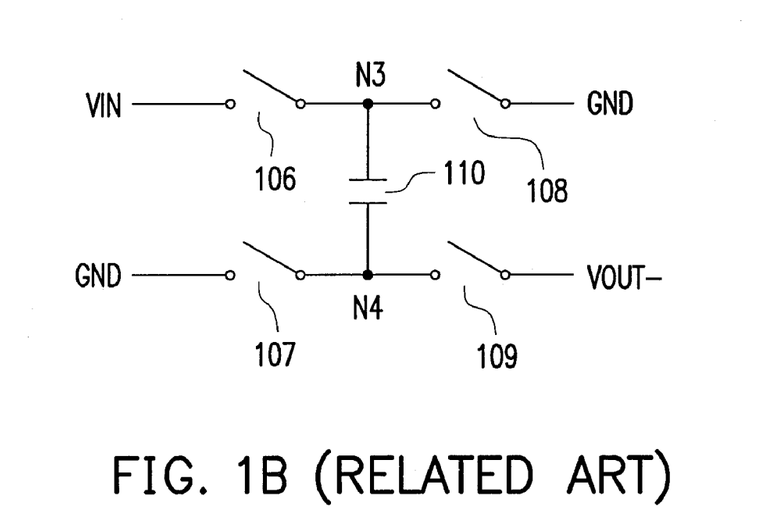
FIG. 1B is a diagram of a charge pump circuit providing a negative voltage.

FIG. 1B is a diagram of a charge pump circuit providing a negative voltage. Referring to FIG. 1B, during a charge period, switches 106 and 107 are turned on, and switches 108 and 109 are turned-off. An input voltage VIN and a ground voltage GND are respectively coupled to two terminals of a capacitor 110, and charge the capacitor 110, so that a voltage difference between the terminals N3 and N4 of the capacitor 110 is the input voltage VIN. During a pump period, the switches 106 and 107 are turned off, and the switches 108 and 109 are turned on. At present, the voltage level of the terminal N3 of the capacitor 110 drops from the original input voltage VIN to the ground voltage GND, and the voltage level of the terminal N4 of the capacitor 110 drops from the ground voltage GND to the negative input voltage −VIN, i.e. an output voltage VOUT−=−VIN, since the voltage difference between the terminals N3 and N4 of the capacitor 110 is the input voltage VIN.

The charge pump circuit can provide the output voltages with different times as large as the input voltage VIN, e.g. −1, 1.5, 2, and 3 times. If the input voltage VIN is 3 volts and the target output voltage is 4.2 volts, the charge pump circuit would efficiently generate the output voltage with 1.5 times as large as the input voltage VIN. In addition, if the target output voltage is 6 volts, the charge pump circuit would efficiently generate the output voltage with 2 times as large as the input voltage VIN, rather than the output voltage with 3 times as large as the input voltage VIN. However, the input voltage VIN may drop as time passes by, and the output voltage may drop when a load of the charge pump circuit increases. The charge pump circuit should efficiently generate the output voltage with proper times as large as the input voltage, to be close to the target output voltage.

SUMMARY OF THE INVENTION

Accordingly, the present invention provides a booster and a voltage detection method thereof that detect a power source to efficiently generate a voltage as needed according to a variation of the power source.

The booster is provided in the present invention. The booster includes a charge pump circuit and a voltage detection circuit. The charge pump is controlled by a switching signal to generate an actual voltage according to a basis voltage, wherein the actual voltage is a product of the basis voltage multiplied by a first preset multiplier. The voltage detection circuit is coupled to the charge pump circuit. The voltage detection circuit selects one of a plurality of first multipliers to serve as the first preset multiplier according to a comparison result between the basis voltage and a target voltage, and generates the switching signal corresponding to the first preset multiplier.

In an embodiment of the foregoing booster, the voltage detection circuit includes a voltage generator, a plurality of first series resistors, a plurality of second series resistors, a plurality of comparators, and a logic circuit. The voltage generator generates the target voltage according to a reference voltage, wherein the target voltage is a product of the reference voltage multiplied by a second preset multiplier of a plurality of second multipliers. The first series resistors coupled to the basis voltage provide a plurality of first divided voltages, wherein each first divided voltage is a product of the basis voltage multiplied by a ratio of each corresponding first multiplier to a maximum of the second multipliers. The second series resistors coupled to the reference voltage provide a second divided voltage, wherein the second divided voltage is a product of the reference voltage multiplied to a ratio of the second preset multiplier to the maximum of the second multipliers. The comparators respectively compare the first divided voltages with the second divided voltage, and thereby generate a plurality of output signals. The logic circuit selects a minimum multiplier among the plurality of first multipliers which make the corresponding first divided voltage thereof greater than the second divided voltage to serve as the first preset multiplier according to the output signals, and generates the switching signal.

In an embodiment of the foregoing booster, the voltage detection circuit includes a plurality of comparators and a logic circuit. The comparators respectively compare a plurality of product values, which are products of the first multipliers respectively multiplied by the basis voltage, with the target voltage, and generate a plurality of output signals. The logic circuit selects a minimum multiplier among the first multipliers which make the corresponding product values thereof greater than the target voltage to serve as the first preset multiplier, and generates the switching signal.

A voltage detection method of a booster is provided in the present invention. In the voltage detection method, a charge pump circuit is provided for generating an actual voltage according to a basis voltage, wherein the actual voltage is a product of the basis voltage multiplied by a first preset multiplier. One of a plurality of first multipliers is selected to serve as the first preset multiplier according to a comparison result between the basis voltage and a target voltage.

In an embodiment of the foregoing voltage detection method, a plurality of first divided voltages of the basis voltage are compared with a second divided voltage of a reference voltage, and a minimum multiplier among the first multipliers which make the corresponding first divided voltages thereof greater than the second divided voltage is selected to serve the first preset multiplier. The target voltage is a product of the reference voltage multiplied by a second preset multiplier of a plurality of second multipliers, each first divided voltage is a product of the basis voltage multiplied by a ratio of each corresponding first multiplier to a maximum of the second multipliers, and the second divided voltage is a product of the reference voltage multiplied by a ratio of the second preset multiplier to the maximum of the second multipliers.

In an embodiment of the foregoing voltage detection method, a plurality of product values, which are products of the first multipliers respectively multiplied by the basis voltage, are compared with the target voltage, and a minimum multiplier among the first multipliers which make the corresponding product values thereof greater than the target is selected to serve as the first preset multiplier.

The present invention provides the booster and the voltage detection method thereof that detect the basis voltage to select a proper multiplier for the charge pump circuit to efficiently generate the actual voltage close to the target voltage.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2:
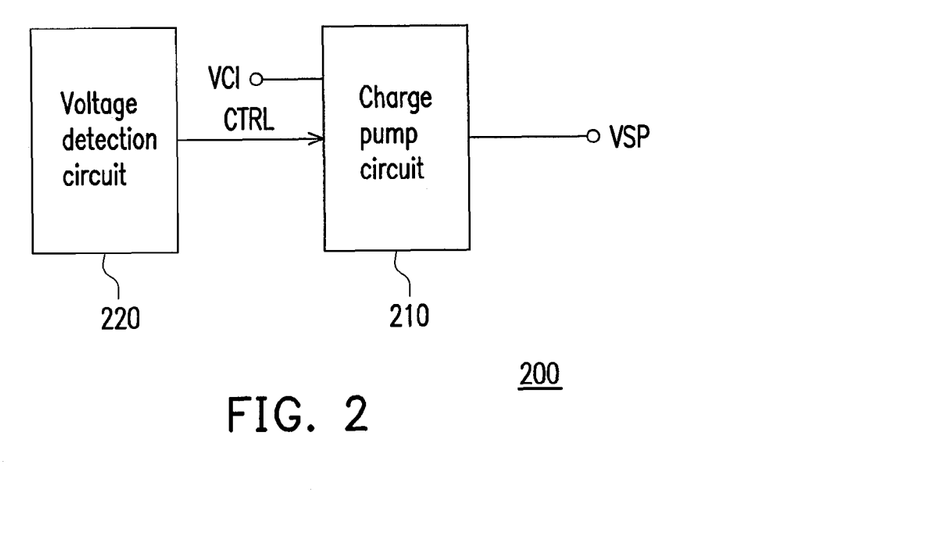
FIG. 2 is a block diagram of a booster according to an embodiment of the present invention.

FIG. 2 is a block diagram of a booster according to an embodiment of the present invention. Referring to FIG. 2, the booster 200 includes a charge pump circuit 210, and a voltage detection circuit 220. The charge pump circuit 210 is controlled by a switching signal CTRL to generate an actual voltage VSP, which is one of products of a basis voltage VCI respectively multiplied by a plurality of first multipliers, e.g. 1.5, 2, 3 and so forth. The basis voltage VCI serves as a power source in the charge pump circuit 210. Since the basis voltage VCI may vary when the booster 200 operates, the voltage detection circuit 220 detects the basis voltage VCI, and selects one of the first multipliers according to a comparison result between the basis voltage VCI and a target voltage to serve as a first preset multiplier. The voltage detection circuit 220 generates the switching signal CTRL corresponding to the first preset multiplier to control the charge pump circuit 210 to generate the actual voltage VSP, which is the product of the basis voltage VCI multiplied by the first preset multiplier.

Figure 3:
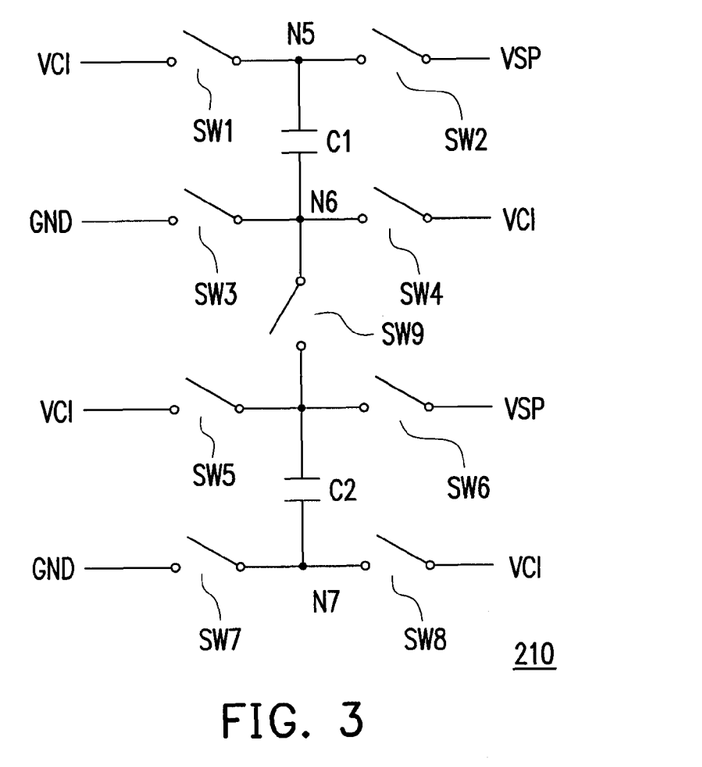
FIG. 3 is a diagram of the charge pump circuit according to the embodiment of the present invention in FIG. 2.

FIG. 3 is a diagram of the charge pump circuit 210 according to the embodiment of the present invention in FIG. 2. Referring to FIG. 3, the charge circuit 210 includes switches SW1 through SW9, and capacitors C1 and C2. As to generate the actual voltage VSP, which is 1.5 times as large as the basis voltage VCI, the switches SW1, SW7 and SW9 are turned on, and other switches are turned off during a charge period, so that each of the capacitors C1 and C2 stores a voltage VCI/2. During a pump period, the switches SW2, SW4, SW6 and SW8 are turned on, and other switches are turned off. At present, the voltage level of a terminal N5 of the capacitor C1 increases to the voltage $3 \times VCI/2$ since a terminal N6 of the capacitor C1 is coupled to the basis voltage VCI and the capacitor C1 stores the voltage VCI/2, i.e. the actual voltage $VSP=3 \times VCI/2$.

As to generate the actual voltage VSP, which is 2 times as large as the basis voltage VCI, the switches SW1 and SW3 are turned on, and other switches are turned off during a charge period, so that the capacitor C1 stores a voltage VCI. During a pump period, the switches SW2 and SW4 are turned on and other switches are turned off. At present, the voltage level of the terminal N5 of the capacitor C1 increases to the voltage $2 \times VCI$, since the terminal N6 of the capacitor C1 is coupled to the basis voltage VCI and the capacitor C1 stores the voltage VCI, i.e. the actual voltage $VSP=2 \times VCI$. As to generate the actual voltage VSP, which is 3 times as large as the basis voltage VCI, the switches SW1, SW3, SW5 and SW7 are turned on and other switches are turned off during a charge period, so that each of the capacitors C1 and C2 stores a voltage VCI. During a pump period, the switches SW2, SW8 and SW9 are turned on, and others are turned off. At present, the voltage level of the terminal N5 of the capacitor C1 increases to a voltage $3 \times VCI$, since a terminal N7 of the capacitor C2 is coupled to the basis voltage VCI, and each of the capacitors C1 and C2 stores the voltage VCI, i.e. the actual voltage $VSP=3 \times VCI$.

Figure 4:
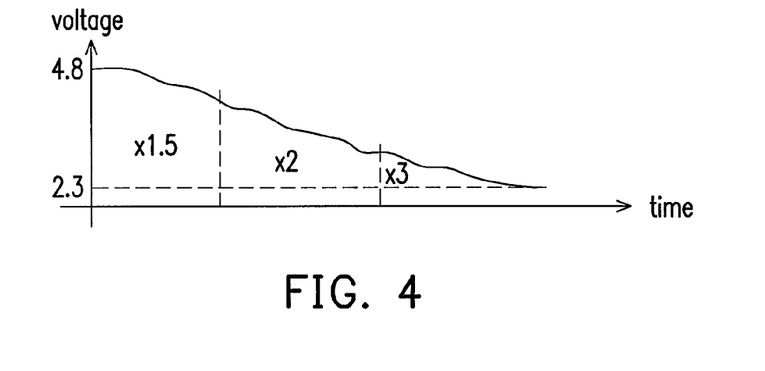
FIG. 4 is a curve diagram of the basis voltage VCI according to the embodiment of the present invention in FIG. 2.
Figure 5:
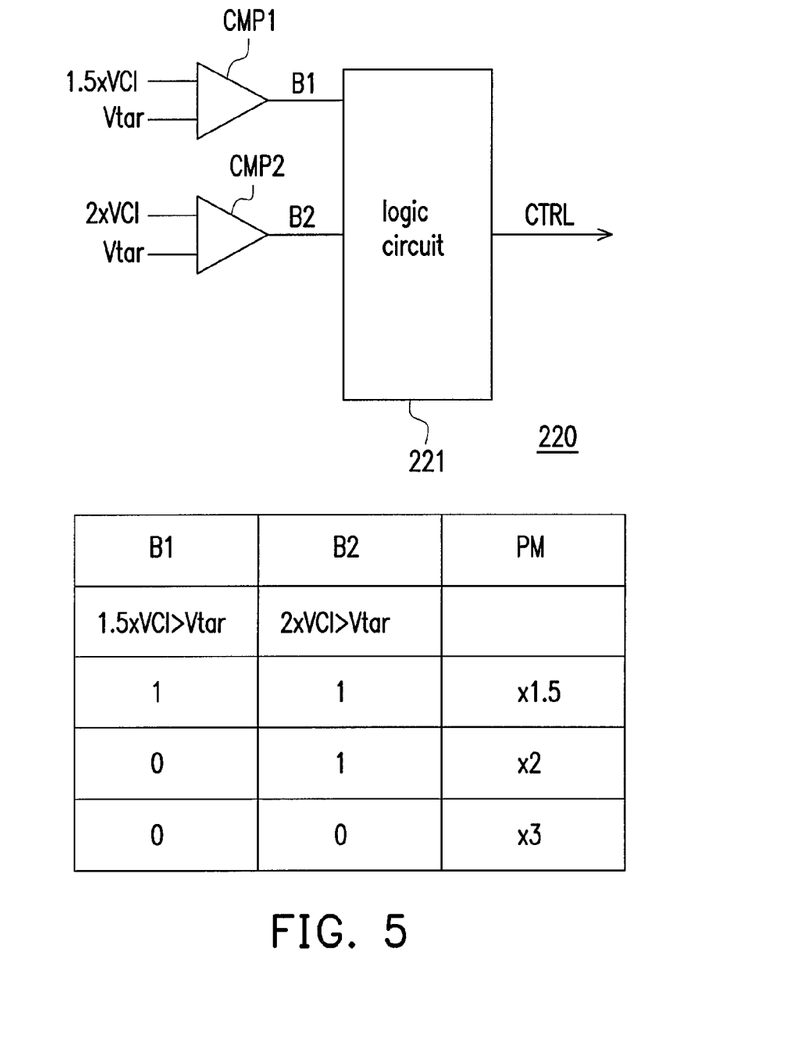
FIG. 5 is a diagram of the voltage detection circuit according to the embodiment of the present invention in FIG. 2.

FIG. 4 is a curve diagram of the basis voltage VCI according to the embodiment of the present invention in FIG. 2. FIG. 5 is a diagram of the voltage detection circuit 220 according to the embodiment of the present invention in FIG. 2. Referring to FIG. 4, it is assumed that the basis voltage is 4 volts, but the basis voltage VCI, for example, changes from 4.8 volts to 2.3 volts as time passes by. The voltage detection circuit 220 includes a plurality of comparators CMP1 through CMP2, and a logic circuit 221. The comparators CMP1 through CMP2 respectively compares a plurality of product values, which are products of the first multipliers, e.g. 1.5 and 2, respectively multiplied by the basis voltage VCI, with the target voltage Vtar, e.g. 5 volts, and thereby generate a plurality of output signals B1 through B2 to the logic circuit 221.

If the product value $1.5 \times VCI$ is greater than the target voltage Vtar, the comparators CMP1 through CMP2 respectively generate the output signals B1 through B2 having logic high levels "1". The first preset multiplier PM should be 1.5 to efficiently generate the actual voltage VSP close to the target voltage Vtar. If the product value $1.5 \times VCI$ is less than the target voltage Vtar, but the product value 2×VCI is greater than the target voltage Vtar, the comparator CMP1 generates the output signal B1 having logic low level "0", and the comparators CMP2 generate the output signal B2 having logic high levels "1". The first preset multiplier PM should be 2 to efficiently generate the actual voltage VSP close to the target voltage Vtar. If the product value 2×VCI is less than the target voltage Vtar, the comparators CMP1 and CMP2 respectively generate the output signals B1 and B2 having logic low levels "0". The first preset multiplier PM should be 3 to efficiently generate the actual voltage VSP close to the target voltage Vtar.

The logic circuit 221 analyzes the output signals B1 through B2 to select a minimum multiplier among the first multipliers which makes the corresponding product values thereof greater than the target voltage Vtar to serve as the first preset multiplier, and generates the switching signal CTRL to control the charge pump circuit 210, so that the charge pump circuit 210 efficiently generates the actual voltage VSP, which is the product of the basis voltage VCI multiplied by the first preset multiplier, and close to the target voltage Vtar.

Figure 6:
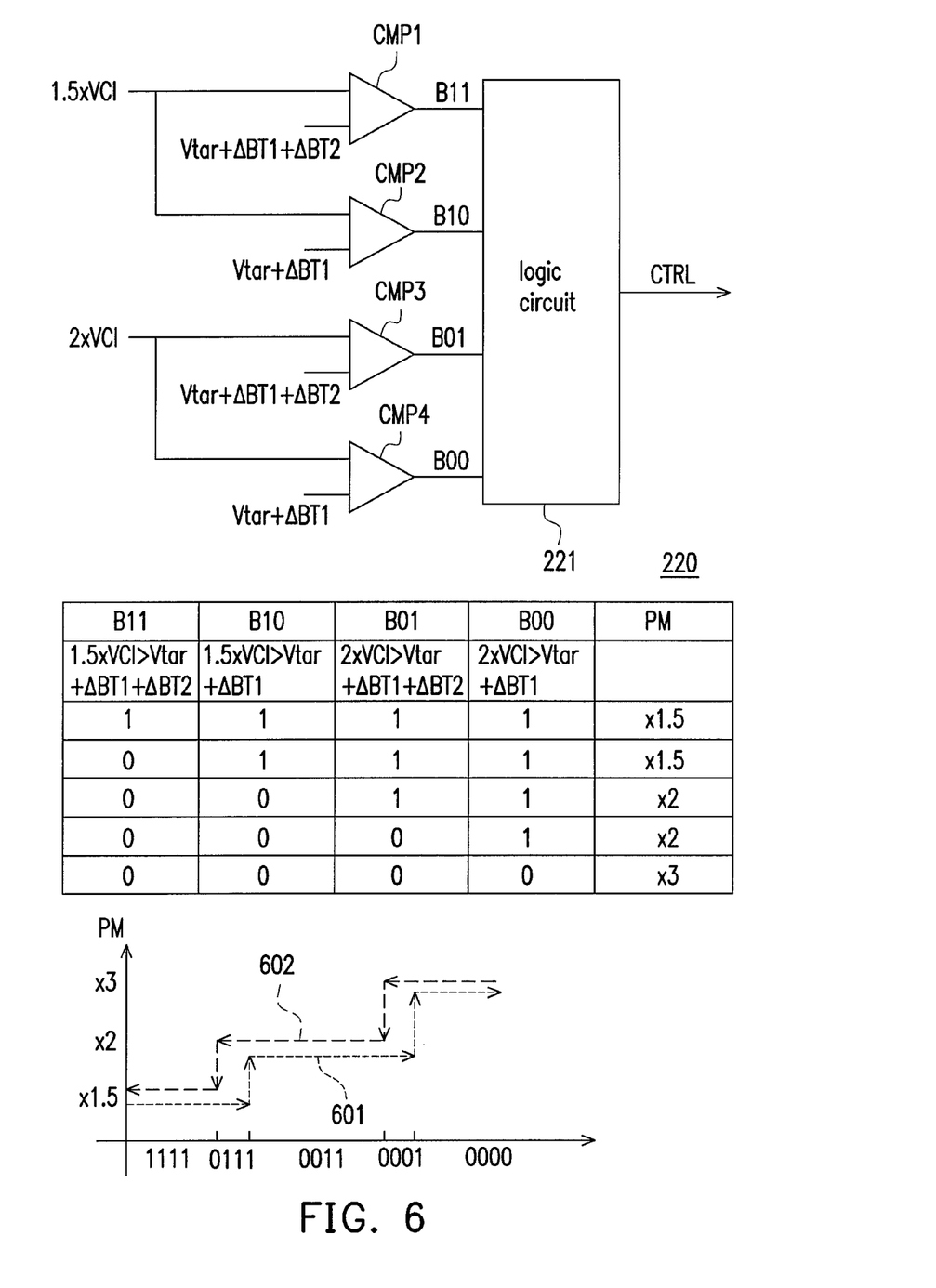
FIG. 6 is a diagram of the voltage detection circuit according to an embodiment of the present invention in FIG. 2.

FIG. 6 is a diagram of the voltage detection circuit 220 according to an embodiment of the present invention in FIG. 2. Generally, the basis voltage VCI may be affected by noise to temporally oscillate, and the actual voltage VSP may be affected by load to decrease. In order to prevent the charge pump circuit 210 frequently switches the first preset multiplier to another, the voltage detection circuit 220 in the embodiment of the present invention design a hysteresis range to assist in selecting the first preset multiplier PM. Referring to FIG. 6, the voltage detection circuit 220 includes a plurality of comparators CMP1 through CMP4, and the logic circuit 221. The comparator CMP1 compares the product values 1.5×VCI with a sum of the target voltage Vtar and a voltage ($\Delta$BT1+$\Delta$BT2), and the comparator CMP2 compares the product values 1.5×VCI with a sum of the target voltage Vtar and a voltage $\Delta$BT1, wherein the voltage $\Delta$BT1 represents a voltage drop that the actual voltage VSP may be affected by load, and the voltage $\Delta$BT2 represents a voltage drop that the basis voltage VCI may be affected by noise. Similarly, the comparator CMP3 compares the product values 2×VCI with the sum of the target voltage Vtar and the voltage ($\Delta$BT1+$\Delta$BT2), and the comparator CMP4 compares the product values 2×VCI with the sum of the target voltage Vtar and a voltage $\Delta$BT1.

If the product value 1.5×VCI is less than the voltage (Vtar+$\Delta$BT1), but the product value 2×VCI greater than the voltage (Vtar+$\Delta$BT1+$\Delta$BT2), as the curve 601 shown, the first preset multiplier PM should be changed from 1.5 to 2 to efficiently generating the actual voltage VSP close to the target voltage Vtar. In the meanwhile, as the curve 601 shown, if the basis voltage VCI decreases to make the product value 2×VCI less than the voltage (Vtar+$\Delta$BT1+$\Delta$BT2), the voltage detection circuit 220 would not directly change the first preset multiplier from 2 to 3 until the product value 2×VCI less than the voltage (Vtar+$\Delta$BT1). Similarly, if the basis voltage VCI increases to make the product value 1.5×VCI greater than the voltage (Vtar+$\Delta$BT1), as the curve 602 shown, the voltage detection circuit 220 would not directly change the first preset multiplier PM from 2 to 1.5 until the product value 1.5×VCI is greater than the voltage (Vtar+$\Delta$BT1+$\Delta$BT2). In other words, the voltage detection circuit 220 still select the minimum multiplier among the first multipliers which make the corresponding product values thereof greater than the target voltage Vtar to serve as the first preset multiplier PM when a difference between the product value corresponding to the minimum multiplier and the target voltage Vtar is less than a noise voltage so as to prevent the charge pump circuit 210 frequently switches from one multiplier to another multiplier.

Figure 7:
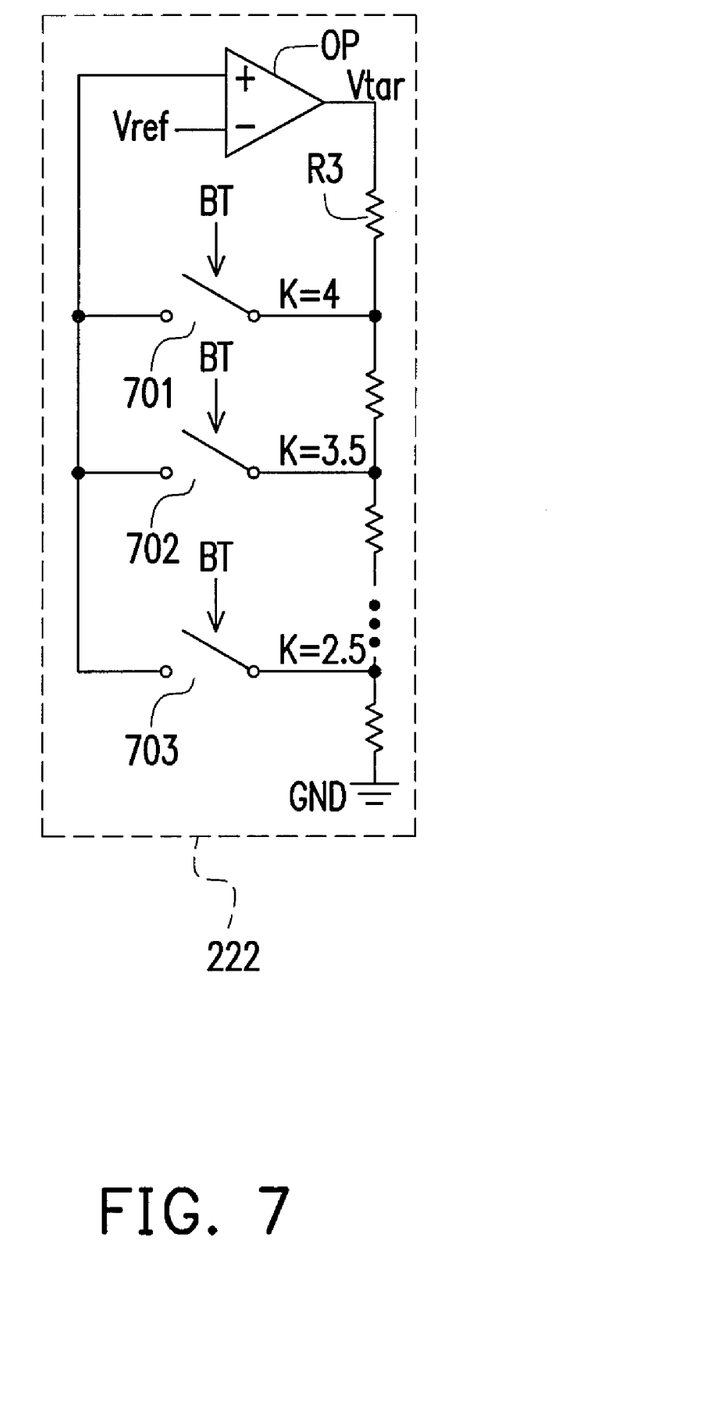
FIG. 7 is a diagram of the voltage generator according to the embodiment of the present invention.

The voltage detection circuit 220 further includes a voltage generator 222. FIG. 7 is a diagram of the voltage generator 222 according to the embodiment of the present invention. Referring to FIG. 7, the voltage generator 222 includes an operational amplifier OP and a plurality of third series resistors R3. A first input terminal (e.g. an inverted terminal "−") and a second input terminal (e.g. a non-inverted terminal "+") of the operational amplifier OP are respectively coupled to a reference voltage Vref and a divided voltage of the target voltage Vtar. The series resistors R3 coupled to the target voltage Vtar provides the said divided voltage of the target voltage Vtar when one of switches 701 through 703 is turned on, wherein the switches 701 through 703 are controlled by a control signal BT. The conductions of the switches 701 through 703 respectively represent a plurality of second multipliers K, e.g. 4, 3.5, 2.5 and so forth, to generate the target voltage Vtar for the comparators CMP1 and CMP2 in FIG. 5 (or the comparators CMP1 through CMP4 in FIG. 6). For example, when the switch 703 is turned on, the operational amplifier OP generates the target voltage Vtar, which is a product of the reference voltage Vref multiplied by a second preset multiplier (i.e. 2.5) of the second multipliers.

Figure 8:
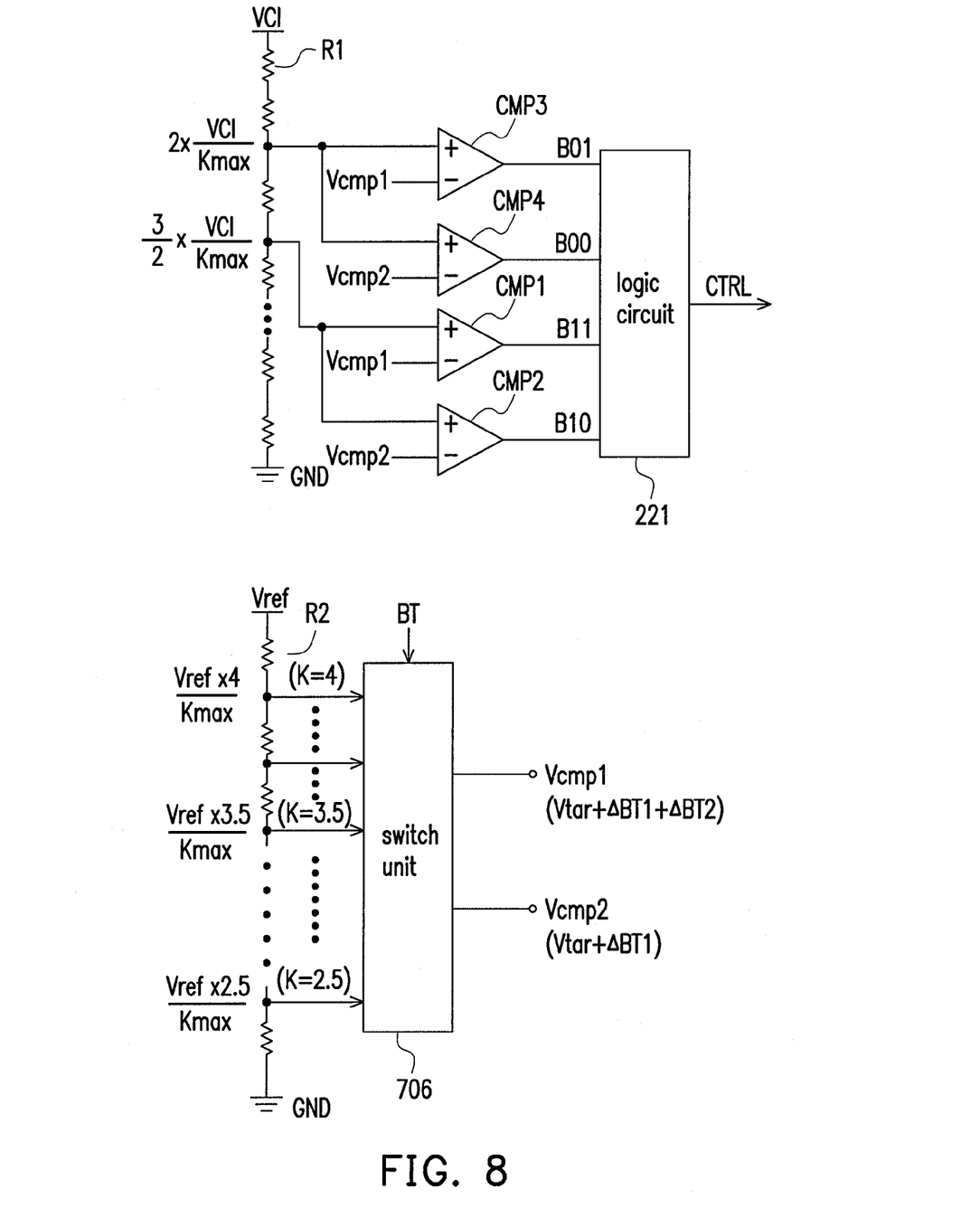
FIG. 8 is a diagram of the voltage detection circuit according to the embodiment of the present invention in FIG. 2.

FIG. 8 is a diagram of the voltage detection circuit 220 according to the embodiment of the present invention in FIG. 2. The voltage detection circuit 220 includes a plurality of comparators CMP1 through CMP4, a plurality of first series resistors R1, a plurality of second series resistors R2, and the logic circuit 221. Instead of comparing the product values corresponding to different first multiplied with the target voltage Vtar in FIG. 6, the comparators CMP1 and CMP3 in FIG. 8 respectively compare a plurality of first divided voltages of the basis voltage VCI with a second divided voltage Vcmp1 (Equivalent to the voltage (Vtar+$\Delta$BT1+$\Delta$BT2) in FIG. 6) of the reference voltage Vref, and the comparators CMP2 and CMP4 in FIG. 8 respectively compare the plurality of first divided voltages of the basis voltage VCI with a second divided voltage Vcmp2 (Equivalent to the voltage (Vtar+$\Delta$BT1) in FIG. 6) of the reference voltage Vref. The comparators CMP1, CMP2, CMP3 and CMP4 respectively generate the output signals B11, B10, B01 and B00. The first series resisters R1 coupled to the basis voltage VCI provide the first divided voltages of the basis voltage VCI to the comparators CMP1 through CMP4, wherein each first divided voltage is a product of the basis voltage VCI multiplied by a ratio of each corresponding first multiplier to a maximum (e.g. Kmax=4) of the second multipliers. The second series resistors R2 coupled to the reference voltage Vref provide the second divided voltages Vcmp1 and Vcmp2 of the reference voltage Vref, wherein the second divided voltages Vcmp1 and Vcmp2 are a product of the reference voltage Vref multiplied by a ratio of the second preset multiplier to the maximum (e.g. Kmax=4) of the second multipliers.

The switch unit 706 is controlled by a control signal BT. The conductions of switch unit 706 coupled to the second series resistors R2 in FIG. 8 correspond to the conductions of the switches 701 through 703 coupled to the third series resistor R3 in FIG. 7. The inputs of the switch unit 706 represent a plurality of second multipliers K, e.g. 4, 3.5, 2.5 and so forth, to generate the voltage Vcmp1 (Vtar+$\Delta$BT1+$\Delta$BT2) for the comparators CMP1 and CMP3, and generate the voltage Vcmp2 (Vtar+$\Delta$BT1) for the comparators CMP2 and CMP4. The switch unit 706 selects two of the plurality of voltages divided by the of the second series resistors R2 to serve as the second divided voltages Vcmp1 and Vcmp2 which correspond respectively to two different K from the plurality of second multipliers.

Although the said embodiments take three multipliers (e.g. 1.5, 2 and 3) that the charge pump circuit 210 uses for generating the actual voltage as an example, the present invention should not be limited thereto. People ordinarily skilled in the art may use more than three multipliers to generate the actual voltage as needed.

Figure 9:
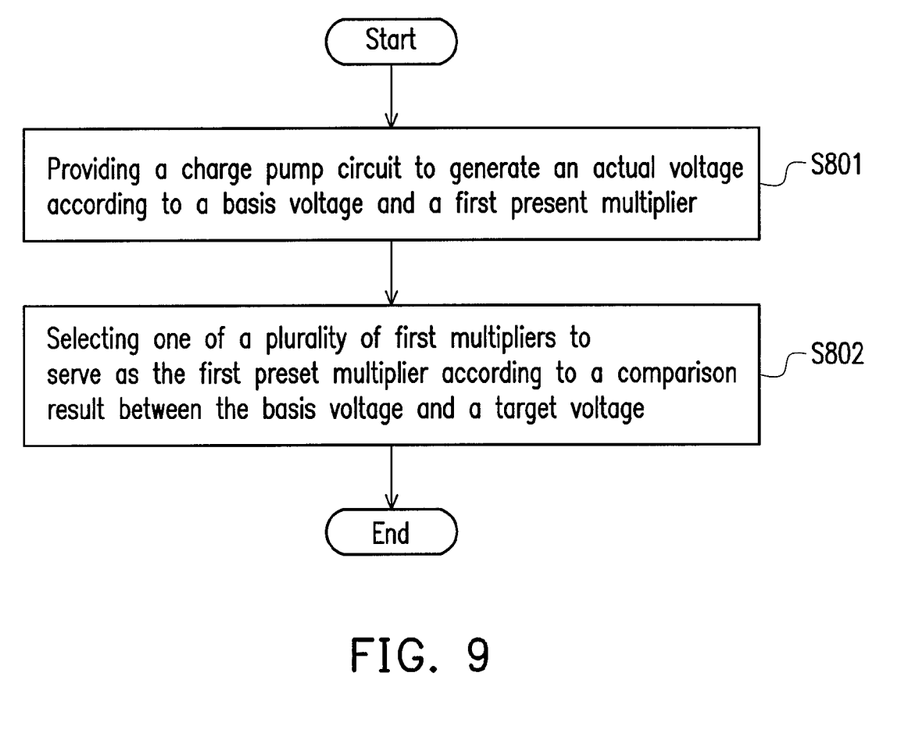
FIG. 9 is a flow chart of a voltage detection method adapted to a booster according to an embodiment of the present invention.

According to the embodiments described above, the steps of the following method could be generalized. FIG. 9 is a flow chart of a voltage detection method adapted to a booster according to an embodiment of the present invention. In the voltage detection method, a charge pump circuit is provided to generate an actual voltage according to a basis voltage, wherein the actual voltage is a product of the basis voltage multiplied by a first preset multiplier (step S801). Next, one of a plurality of first multipliers is selected to serve as the first preset multiplier according to a comparison result between the basis voltage and a target voltage (step S802).

In summary, the said embodiments provides the booster and the voltage detection method thereof that can select a proper multiplier for the charge pump circuit to efficiently generate the actual voltage close to the target voltage. As the basis voltage changes, the voltage detection circuit not only can adjust a structure of the charge pump circuit for providing the actual voltage with different times as large as the basis voltage.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A booster, comprising:
a charge pump circuit, controlled by a switching signal to generate an actual voltage according to a basis voltage, wherein the actual voltage is a product of the basis voltage multiplied by a first preset multiplier; and
a voltage detection circuit, coupled to the charge pump circuit for selecting one of a plurality of first multipliers to serve as the first preset multiplier according to a comparison result between the basis voltage and a target voltage, and generating the switching signal corresponding to the first preset multiplier, wherein the voltage detection circuit comprises:
a plurality of first series resistors, coupled to the basis voltage for providing a plurality of first divided voltages, wherein each first divided voltage is a product of the basis voltage multiplied by a ratio of each corresponding first multiplier to a maximum of a plurality of second multipliers;
a plurality of second series resistors, coupled to a reference voltage for providing a second divided voltage, wherein the second divided voltage is a product of the reference voltage multiplied by a ratio of a second preset multiplier to the maximum of the second multipliers;
a plurality of comparators, respectively comparing the first divided voltages with the second divided voltage, and thereby generating a plurality of output signals; and
a logic circuit, selecting a minimum multiplier among the first multipliers which make the corresponding first divided voltages thereof greater than the second divided voltage to serve as the first preset multiplier according to the output signals, and generating the switching signal.

2. The booster as claimed in claim 1, wherein the logic circuit still selects the minimum multiplier to serve as the first preset multiplier when a difference between the first divided voltage corresponding to the minimum multiplier and the second divided voltage is less than a noise voltage.

3. The booster as claimed in claim 1, wherein the charge pump circuit comprises:
a first switch, having a first terminal coupled to the basis voltage, and a second terminal;
a second switch, having a first terminal coupled to the second terminal of the first switch, and a second terminal outputting the actual voltage;
a third switch, having a first terminal coupled to a ground voltage, and a second terminal;
a fourth switch, having a first terminal coupled to the second terminal of the third switch, and a second terminal coupled to the basis voltage;
a first capacitor, having a first terminal coupled to the second terminal of the first switch, and a second terminal coupled to the second terminal of the third switch, wherein the first through the fourth switches are controlled by the switching signal.

4. The booster as claimed in claim 3, wherein the charge pump circuit further comprises:
a fifth switch, having a first terminal coupled to the basis voltage, and a second terminal;
a sixth switch, having a first terminal coupled to the second terminal of the fifth switch, and a second terminal outputting the actual voltage;
a seventh switch, having a first terminal coupled to the ground voltage, and a second terminal;
a eighth switch, having a first terminal coupled to the second terminal of the seventh switch, and a second terminal coupled to the basis voltage;
a ninth switch, having a first terminal coupled to the second terminal of the third switch, and a second terminal coupled to the second terminal of the fifth switch; and
a second capacitor, having a first terminal coupled to the second terminal of the fifth switch, and a second terminal coupled to the second terminal of the seventh switch, wherein the fifth through the ninth switches are controlled by the switching signal.

5. A voltage detection method of a booster, comprising:
providing a charge pump circuit for generating an actual voltage according to a basis voltage, wherein the actual voltage is a product of the basis voltage multiplied by a first preset multiplier; and
selecting one of a plurality of first multipliers to serve as the first preset multiplier according to a comparison result between the basis voltage and a target voltage, wherein the step of selecting one of the first multipliers to serve as the first preset multiplier according to the comparison result between the basis voltage and the target voltage comprises:
respectively comparing a plurality of first divided voltages of the basis voltage with a second divided voltage of a reference voltage, wherein each first divided voltage is a product of the basis voltage multiplied by a ratio of each corresponding first multiplier to a maximum of a plurality of second multipliers, and the second divided voltage as the target voltage is a product of the reference voltage multiplied by a ratio of a second preset multiplier to the maximum of the second multipliers; and
selecting a minimum multiplier among the first multipliers which make the corresponding first divided voltages thereof greater than the second divided voltage to serve as the first preset multiplier.

6. The voltage detection method as claimed in claim 5, wherein the step of selecting one of the first multipliers to serve as the first preset multiplier according to the comparison result between the basis voltage and the target voltage further comprises:

keeping on selecting the minimum multiplier when a difference between the first divided voltage corresponding to the minimum multiplier and the second divided voltage is less than a noise voltage.

7. A booster comprising:
a charge pump circuit, controlled by a switching signal to generate an actual voltage according to a basis voltage, wherein the actual voltage is a product of the basis voltage multiplied by a first preset multiplier; and
a voltage detection circuit, coupled to the charge pump circuit for selecting one of a plurality of first multipliers to serve as the first preset multiplier according to a comparison result between the basis voltage and a target voltage, and generating the switching signal corresponding to the first preset multiplier, wherein the voltage detection circuit comprises:
a voltage generator, generating the target voltage according to a reference voltage, wherein the target voltage is a product of a reference voltage multiplied by a second preset multiplier of a plurality of second multipliers.

8. The booster as claimed in claim 7, wherein the voltage generator comprises:
an operational amplifier, having a first input terminal coupled to the reference voltage, a second input terminal coupled to a third divided voltage of the target voltage, and an output terminal outputting the target voltage; and
a plurality of third series resistors, coupled to the target voltage for providing the third divided voltage, wherein the third divided voltage is a ratio of the target voltage to the second preset multiplier.

9. A booster, comprising:
a charge pump circuit, controlled by a switching signal to generate an actual voltage according to a basis voltage, wherein the actual voltage is a product of the basis voltage multiplied by a first preset multiplier; and
a voltage detection circuit, coupled to the charge pump circuit for selecting one of a plurality of first multipliers to serve as the first preset multiplier according to a comparison result between the basis voltage and a target voltage, and generating the switching signal corresponding to the first preset multiplier, wherein the voltage detection circuit comprises:
a plurality of comparators, respectively comparing a plurality of product values, which are products of the first multipliers respectively multiplied by the basis voltage, with the target voltage, and thereby generating a plurality of output signals; and
a logic circuit, selecting a minimum multiplier among the first multipliers which make the corresponding product values thereof greater than the target voltage to serve as the first preset multiplier, and generating the switching signal.

10. The booster as claimed in claim 9, wherein the logic circuit still selects the minimum multiplier to serve as the first preset multiplier when a difference between the product value corresponding to the minimum multiplier and the target voltage is less than a noise voltage.

11. A voltage detection method of a booster, comprising:
providing a charge pump circuit for generating an actual voltage according to a basis voltage, wherein the actual voltage is a product of the basis voltage multiplied by a first preset multiplier; and
selecting one of a plurality of first multipliers to serve as the first preset multiplier according to a comparison result between the basis voltage and a target voltage, wherein the target voltage is a product of a reference voltage multiplied by a second preset multiplier of a plurality of second multipliers.

12. The voltage detection method as claimed in claim 11, wherein the step of selecting one of the first multipliers to serve as the first preset multiplier according to the comparison result between the basis voltage and the target voltage comprises:
respectively comparing a plurality of product values, which are products of the first multipliers respectively multiplied by the basis voltage, with the target voltage; and
selecting a minimum multiplier among the first multipliers which make the corresponding product values thereof are greater than the target voltage to serve as the first preset multiplier.

13. The voltage detection method as claimed in claim 12, wherein the step of selecting one of the first multipliers to serve as the first preset multiplier according to the comparison result between the basis voltage and the target voltage further comprises: keeping on selecting the minimum multiplier when a difference between the product voltage corresponding to the minimum multiplier and the target voltage is less than a noise voltage.

* * * * *